April 16, 1929. R. H. FLOYD ET AL 1,708,942
WATER GAUGE
Filed March 1, 1926
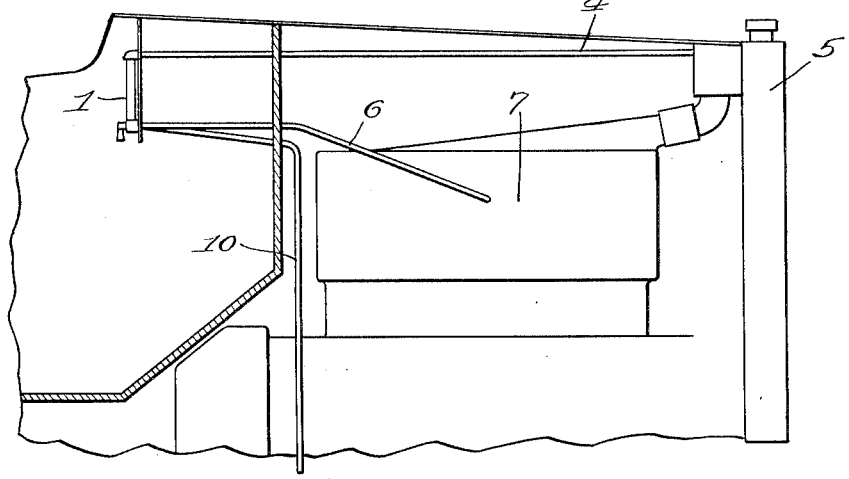
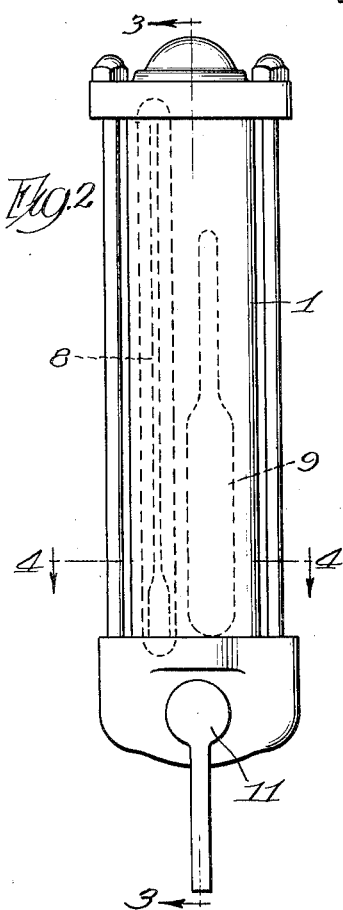
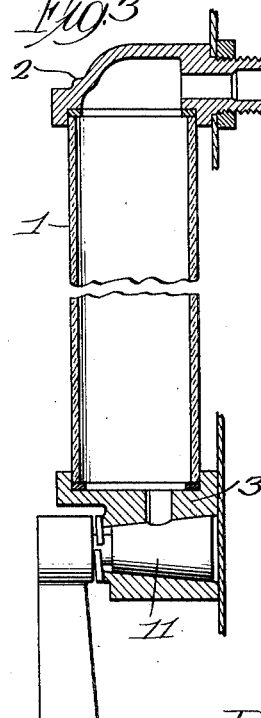
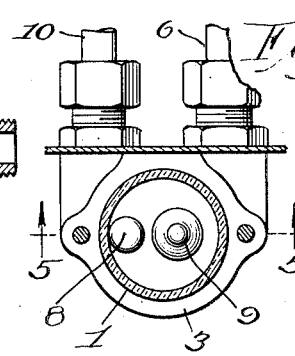
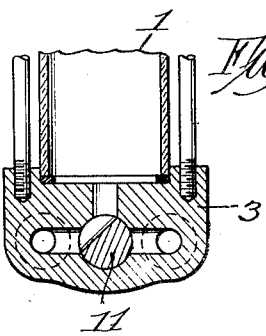
Inventors:
Ray H. Floyd.
Mortimer G. Wolf.
By Arthur F. Durand
Atty.

Patented Apr. 16, 1929.

1,708,942

UNITED STATES PATENT OFFICE.

RAY H. FLOYD AND MORTIMER G. WOLF, OF CHICAGO, ILLINOIS.

WATER GAUGE.

Application filed March 1, 1926. Serial No. 91,303.

This invention relates to water gauges for motor vehicles, for indicating the height of the water in the radiator of the motor. The invention also relates to devices of this kind having thermometers and hydrometers whereby the temperature of the water will be indicated, and also the condition of the anti-freezing mixture in winter.

The object of the invention is to provide a novel and improved water gauge of the foregoing general character, having certain features of improvement tending to render the same more satisfactory in use, and more satisfactory to manufacture, the invention being in the nature of an improvement on the construction shown and described and claimed in our prior application No. 11,089, filed February 24, 1925.

It is also an object to provide certain details and features of construction in combinations tending to increase the general efficiency and desirability of a device of this particular construction and character.

To these and other useful ends the invention consists in matters hereinafter set forth and claimed and shown in the accompanying drawings in which:

Figure 1 is a side elevation of a portion of the motor of an automobile or other motor vehicle, showing a water gauge on the dash of the vehicle embodying the principles of the invention.

Figure 2 is an enlarged front elevation of the said water gauge.

Figure 3 is a sectional line 3, 3, in Figure 2.

Figure 4 is a horizontal section on line 4, 4, in Figure 2.

Figure 5 is a vertical section on line 5, 5, in Figure 4.

As thus illustrated, the invention comprises a vertically disposed water gauge tube 1 held in water-tight upper and lower fittings 2 and 3 as shown, these fittings being suitably and removably secured to the dash of the vehicle, as shown, by the nuts shown. The upper fitting 2 is connected by a pipe 4 to the upper portion of the radiator or condenser 5 of the engine, while the lower fitting is connected by pipe 6 with the side of the water jacket 7 of the engine. In this way, of course, when the radiator is filled, the water will gradually rise in the jacket 7 until it flows out through the pipe 6 and into the tube 1, and the water will then rise until it enters the pipe 4, if the radiator is entirely filled. In any event, the water will rise a distance in the water gauge glass tube 1 and during the running of the engine the water can circulate from the water jacket through the glass tube 1 and through the pipe 4 back to the radiator whereby the temperature of the water in the glass tube 1 will always be substantially the same as the temperature of the water in the jacket of the engine, when the engine is running. The glass tube 1 is only operative to show different levels of the water in the upper portion of the radiator, so that the water will disappear completely from the gauge when the level of the water in the radiator falls to a point below the lower end of the tube 1, which point is still a little above the engine jacket, or adjacent to the top thereof. Consequently, of course, if the water disappears from the glass tube 1, before the lowering water level reaches the engine jacket, because of the height of the lower end of the gauge, the driver will be inclined to promptly replenish the water, as it will not be apparent whether the water has fallen to a very low level, perhaps below the water jacket of the engine, or has simply fallen to the top of the water jacket. If the glass tube were of a length to show levels in the lower portion of the radiator, the impression might be, with some drivers, that there was still water enough in the radiator and in the cooling system to cool the engine. But with no water whatever in the water gauge, the driver will be inclined to replenish the water, even though it has fallen only slightly in the radiator, or just barely enough to have it disappear from the water gauge. The pipe 4 prevents any water or steam from entering the passenger compartment of the vehicle, as any water or steam passing out of the gauge must return to the cooling system.

In addition, a thermometer 8 is disposed in the water gauge glass tube 1, as shown, with its upper and lower ends held in sockets in the upper and lower fittings 2 and 3 and with the water circulating while the engine is running, the temperature of the water in the water jacket will be shown.

Also, a hydrometer 9 is enclosed in the glass tube 1, thereby to show the condition of the anti-freezing mixture in winter.

In addition, a drain pipe 10 is connected to lower fitting 3, and a two-way valve 11 is provided in the said lower fitting, thereby to connect the lower end of the gauge with either the pipe 6 or the pipe 10, as may be desired. This valve controls the circulation of hot water and steam through the gauge and back to the cooling system. When the valve is thrown into position to connect the pipe 10 to the lower end of the water gauge, the pipe 6 is cut off, and the water will be drained out of the gauge in the desired manner, and the water gauge will be out of commission.

Regarding the hydrometer, it will be seen that with the drain valve 11 the water can be placed at such a height in the glass tube 1 that the hydrometer will float properly, and will work properly, whereas without the drain the water might be at such a level that the hydrometer would not act properly, and would not indicate the condition of the anti-freezing mixture of the water.

With this construction, therefore, the manner of using the invention will be to replenish the water whenever it disappears from the water gauge on the dash. With no water in the gauge, which is more of an indicator than a gauge, the driver will replenish the water immediately. It is not so important, therefore, to know the exact height of the water in the cooling system, as it is to show that sufficient water has been evaporated out of the system to make it desirable if not necessary to replenish the water immediately. If the exact height of the water in the cooling system, throughout the radiator and water jacket, was always visible or indicated, there would be danger of creating the misapprehension that the engine was all right as long as there was any water whatever in the gauge. But with the gauge or indicator set high, so that the water therein will disappear before the lowering water level reaches the engine jacket, there is more assurance that the water will be replenished before it has gotten low enough to do any harm. Moreover, the water cannot boil over in the gauge or indicator and spill into the passenger compartment of the car, for if when in use it boils over the water and steam will pass through the tube 4 to the top of the radiator. When the device is drained, the water will pass out through the tube 10 and be discharged on to the ground.

The nuts 12, 13 and 14, on the bases 15, 16 and 17, can obviously be removed to permit removal of the device from the upper dash 18 of the motor vehicle. The tie rods or long screw bolts 19 that pass down through the upper fitting 2 are, as shown, threaded at their lower ends to screw into the lower fitting 3, and by removing these rods and the nuts 12, 13 and 14 the device can be opened to permit removal of the thermometer and hydrometer.

Without disclaiming anything, and without prejudice to any novelty disclosed, what we claim as our invention is:

1. In combination with the engine and radiator of a motor vehicle, a water gauge disposed in position to be viewed by the driver while driving the vehicle, and means whereby said gauge is connected with the cooling system of the engine in position to be filled by water rising from the engine to indicate to said driver the height of the water therein, said gauge comprising a vertically disposed glass tube, upper and lower fittings engaging the upper and lower ends of said tube, thereby to position the water gauge on the dash of the motor vehicle, said fittings having portions extending through the dash, means engaging said portions to hold the fittings rigid with the dash, the upper fitting being pipe connected to the upper portion of the cooling system and the lower fitting being pipe connected to the water jacket of the engine, so that any water passing out of the gauge will be returned to the cooling system, and preventing any water from being spilled in the vehicle, and a valve in the lower fitting, operable by the driver to control the circulation of water and steam through the water gauge.

2. A structure as specified in claim 1, in combination with a drain pipe leading from the said lower fitting, controllable by said valve, so that the water can be cut off from the gauge and drained therefrom at will.

3. A structure as specified in claim 1, and a thermometer in said glass tube, thereby to show the temperature of the water circulating through the gauge from the engine to the radiator, and means for connection and disconnection of the upper and lower fittings to and from the ends of the glass tube, and from the upper dash of the vehicle, permitting insertion and removal of the thermometer, the lower fitting being disposed at a height whereby the water will disappear from the gauge before the lowering water level reaches the engine jacket.

Specification signed this 29th day of September, 1925.

RAY H. FLOYD.
MORTIMER G. WOLF.